US011463156B2

(12) United States Patent
Abedini et al.

(10) Patent No.: US 11,463,156 B2
(45) Date of Patent: Oct. 4, 2022

(54) REPEATER COMMUNICATION SYSTEM WITH POWER MEASUREMENT CAPABILITY

(71) Applicant: QUALCOMM Incorporated, San Diego, CA (US)

(72) Inventors: Navid Abedini, Somerset, NJ (US); Raju Hormis, New York, NY (US); Junyi Li, Chester, NJ (US); Juergen Cezanne, Ocean Township, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 16/824,217

(22) Filed: Mar. 19, 2020

(65) Prior Publication Data

US 2020/0322037 A1 Oct. 8, 2020

Related U.S. Application Data

(60) Provisional application No. 62/829,951, filed on Apr. 5, 2019.

(51) Int. Cl.
*H04B 7/155* (2006.01)
*H04W 52/46* (2009.01)
(Continued)

(52) U.S. Cl.
CPC ....... *H04B 7/15535* (2013.01); *H04B 7/0617* (2013.01); *H04B 7/2606* (2013.01); *H04W 52/46* (2013.01); *H04W 52/52* (2013.01)

(58) Field of Classification Search
None
See application file for complete search history.

(56) References Cited

U.S. PATENT DOCUMENTS

2011/0182174 A1* 7/2011 Pi ................. H04W 88/10
370/229
2016/0095034 A1* 3/2016 Hampel ............. H04W 36/14
370/331
(Continued)

FOREIGN PATENT DOCUMENTS

WO 2017055157 A1 4/2017

OTHER PUBLICATIONS

International Search Report and Written Opinion—PCT/US2020/023907—ISA/EPO—dated Jul. 13, 2020.
(Continued)

*Primary Examiner* — Gregory B Sefcheck
*Assistant Examiner* — Amarnauth G Persaud
(74) *Attorney, Agent, or Firm* — Qualcomm Incorporated

(57) ABSTRACT

This disclosure generally relates to systems, devices, apparatuses, products, and methods for wireless communication. For example, a communication system may include a repeater having a first communication interface that receives a control message that indicates a measurement configuration for a second communication interface of the repeater that is different than the first communication interface. The repeater receives, via the second communication interface, a first signal at the repeater from a first device. The repeater also measures a power metric associated with the first signal based on the measurement configuration. In some implementations, a base station or another device (e.g., UE), may communicate with the repeater and take one or more actions based on the power metric measured by the repeater.

30 Claims, 9 Drawing Sheets

(51) Int. Cl.
    *H04B 7/26*     (2006.01)
    *H04B 7/06*     (2006.01)
    *H04W 52/52*     (2009.01)

(56) References Cited

U.S. PATENT DOCUMENTS

| | | | |
|---|---|---|---|
| 2016/0095108 A1* | 3/2016 | Ryoo | H04W 72/0426 |
| | | | 370/329 |
| 2018/0091212 A1* | 3/2018 | Lee | H04L 5/0048 |
| 2018/0219659 A1* | 8/2018 | Wernersson | H04B 7/024 |
| 2018/0332659 A1* | 11/2018 | Hwang | H04W 76/10 |
| 2019/0020401 A1 | 1/2019 | Gharavi et al. | |
| 2019/0079176 A1 | 3/2019 | Weissman | |
| 2020/0323032 A1* | 10/2020 | Kim | H04W 52/0251 |

OTHER PUBLICATIONS

Tsinos C.G., et al., "Hybrid Analog-Digital Transceiver Designs for mmWave Amplify- and-Forward Relaying Systems", 2018 41 st International Conference on Telecommunications and Signal Processing (TSP), IEEE, Jul. 4, 2018 (Jul. 4, 2018), pp. 1-6, XP033389752, DOI: 10.1109/TSP.2018.8441203 [retrieved on Aug. 20, 2018] p. 446-p. 447.

Zeng Y., et al., "Joint Relay Selection and Beamforming for mmWave Fronthauling Network", 2017 IEEE/CIC International Conference on Communications in China (ICCC), IEEE, Oct. 22, 2017 (Oct. 22, 2017), pp. 1-6, XP033343212, DOI: 10.1109/ICCCHINA.2017.8330395, [retrieved on Apr. 2, 2018], abstract, paragraph [001.].

\* cited by examiner

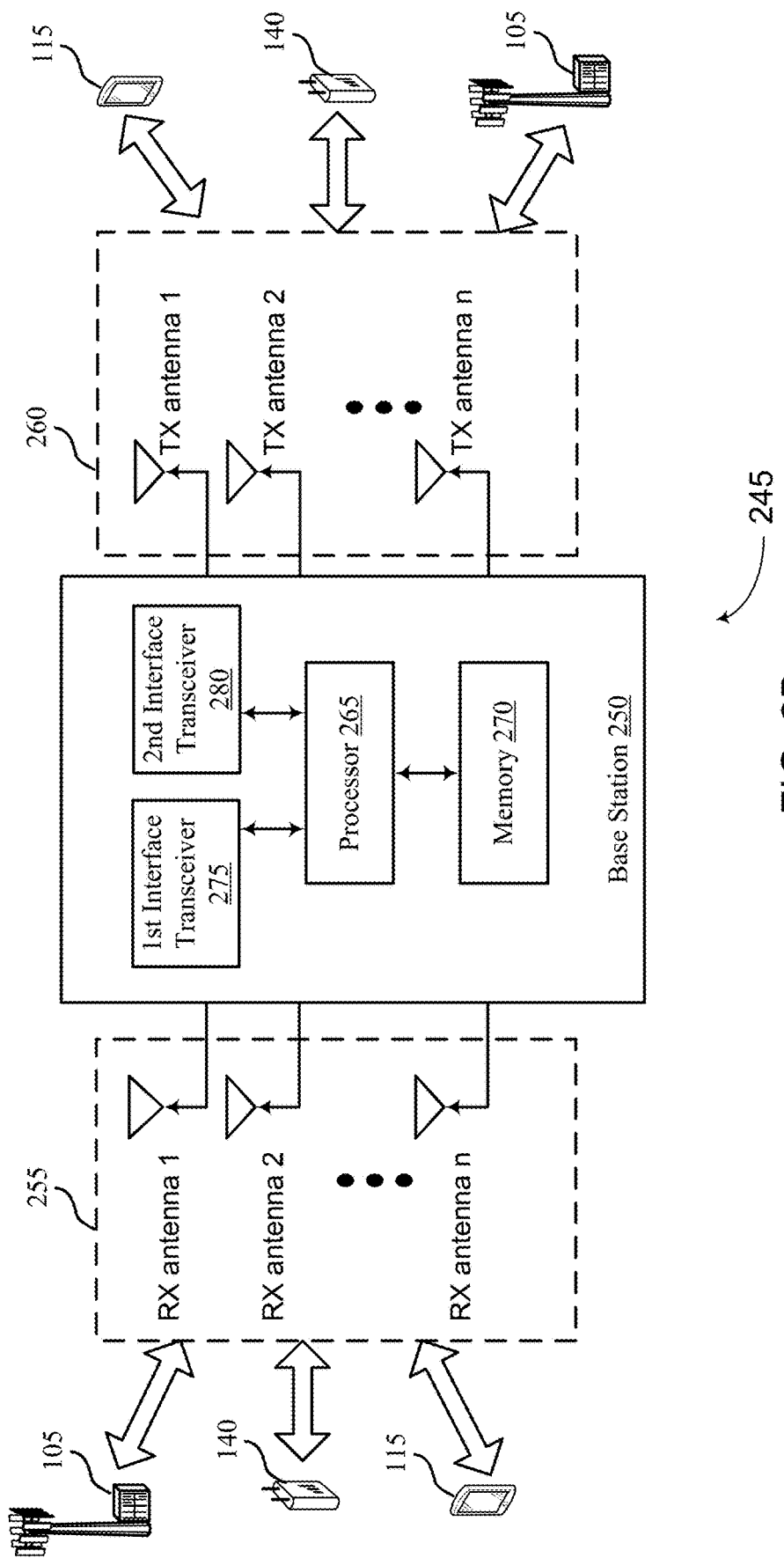

REPEATER COMMUNICATION SYSTEM WITH POWER MEASUREMENT CAPABILITY

CROSS REFERENCE

The present application for patent claims priority to U.S. Provisional Patent Application No. 62/829,951, entitled "Repeater Communication System with Power Measurement Capability," filed Apr. 5, 2019, which is expressly incorporated by reference herein.

TECHNICAL FIELD

This disclosure relates generally to wireless communications, and more specifically, to measuring signal power within a repeater communication system.

DESCRIPTION OF THE RELATED TECHNOLOGY

Wireless communications systems are widely deployed to provide various types of communication content such as voice, video, packet data, messaging, broadcast, and other types of content. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes that may simultaneously support communication for multiple communication devices (e.g., user equipment (UE)).

Some wireless signals transmitted within a wireless communication system may be limited by path-loss through the air, physical blockers, or other constraints. To address this issue, wireless communications systems may use wireless repeaters for repeating and extending signals sent between various system nodes. A signal received at a repeater may be a signal transmitted by a base station intended for a UE, a signal transmitted by a UE intended for a base station, a signal transmitted by one UE intended for another UE, or a signal transmitted by one base station intended for another base station.

SUMMARY

The systems, methods and devices of this disclosure each have several innovative aspects, no single one of which is solely responsible for the desirable attributes disclosed herein. This disclosure generally relates to systems, devices, apparatuses, products, and methods for wireless communication.

As one example, the disclosure specifically relates to systems, devices, apparatuses, products, and methods regarding a repeater that receives, via a first communication interface of the repeater, a control message that indicates a measurement configuration for a second communication interface of the repeater that is different than the first communication interface. The repeater also receives, via the second communication interface, a first signal at the repeater from a first device. The repeater measures a power metric associated with the first signal based on the measurement configuration.

As another example, the disclosure specifically relates to systems, devices, apparatuses, products, and methods regarding a base station that transmits a control message to a first communication interface of a repeater that indicates a measurement configuration for a second communication interface of the repeater that is different than the first communication interface. The base station also receives a report from the first communication interface of the repeater that indicates a power metric associated with a signal received on the second communication interface and measured at the repeater based on the measurement configuration. The base station sets a communication parameter based on the power metric.

BRIEF DESCRIPTION OF THE DRAWINGS

The system may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 2B illustrates an example block diagram of a base station in accordance with aspects of the present disclosure.

DETAILED DESCRIPTION

Figure 1:
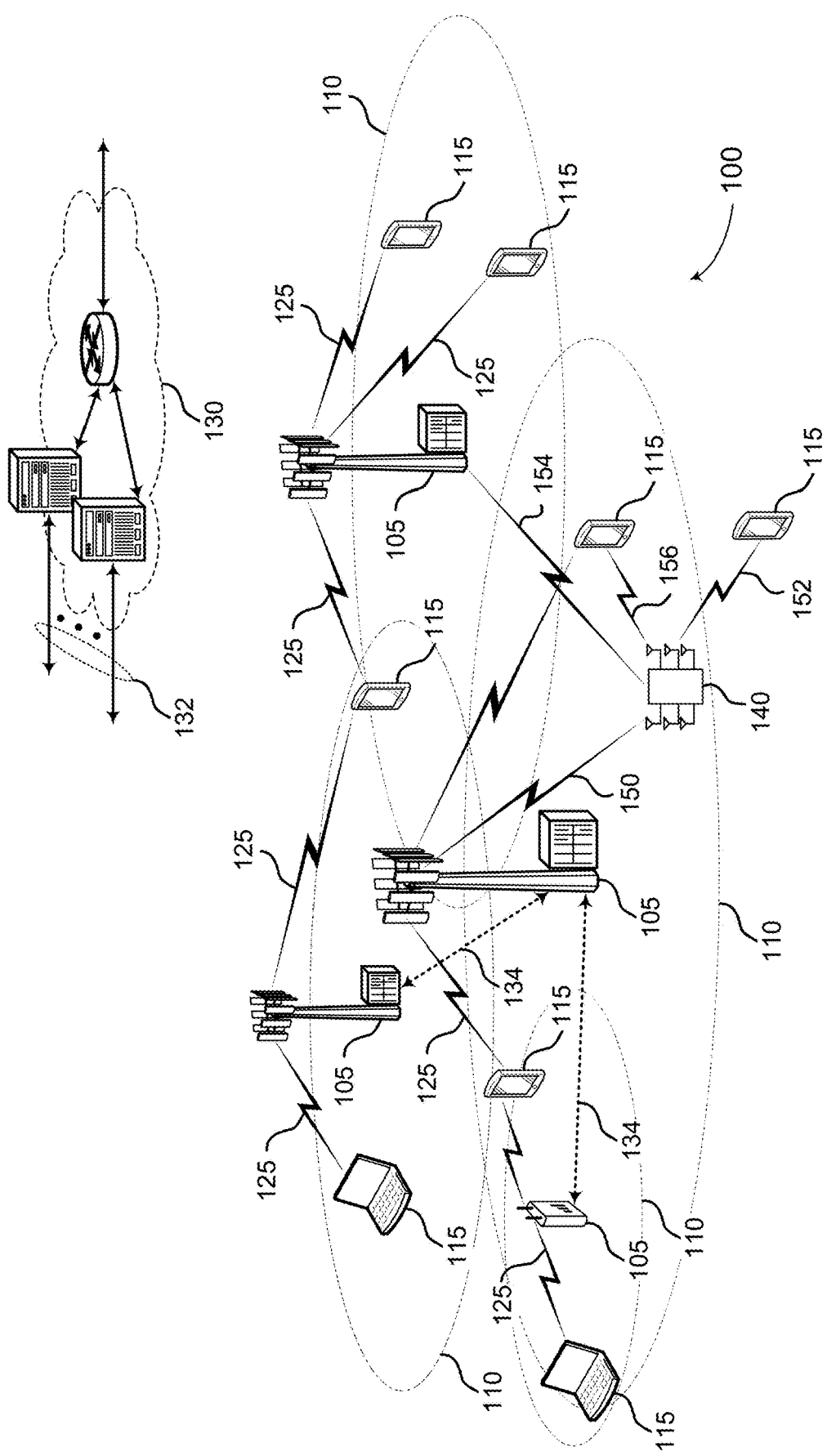
FIG. 1 illustrates an example of a system for wireless communication that supports a repeater in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

The systems and techniques described in this detailed description provide various mechanisms for measuring signal power within a repeater communication system. Some repeaters within a wireless communication system may be designed to be layer 1 millimeter wave repeaters (L1 mmW repeaters). These repeaters may include a low frequency interface (e.g., LTE, sub-6 GHz NR, Wi-Fi, Bluetooth, or other communication protocol) and a high frequency interface (e.g., a mmWave interface). A L1 mmW repeater may be able to receive and forward a mmWave signal (with some internal signal processing, such as applying a gain to the received signal before forwarding the amplified signal), but may not be able to further interpret the content of a signal received on its mmW interface or generate new content for a mmW signal to be transmitted on the mmW interface. As one example, in some implementations, a L1 mmW wave repeater may lack at least some of the physical layer, medium access control, and radio resource control (PHY/MAC/RLC) (or higher layers) protocol stack on the mmW interface that would be present in layer 2 or layer 3 repeaters to interpret the content of a received mmW signal or generate new content for a mmW signal.

These limitations of a L1 mmW repeater may make it more difficult to perform certain access procedures, association procedures, and/or beam management procedures within the wireless communication system. For example, when a base station and a L1 mmW repeater exchange messages via a mmW interface, the L1 mmW repeater may not be able to interpret the content of the received messages, such as downlink reference signals (e.g., a synchronization signal block (SSB), a channel-state information reference signal (CSI-RS), etc.). Similarly, as another example, the L1 mmW repeater may not be able to generate content for uplink reference signals (e.g., a sounding reference signal (SRS), etc.) on the mmW interface. These uplink and downlink reference signals could allow the base station and repeater to better identify a preferred beam pair link. However, if the repeater cannot interpret or generate these types of reference signals on the mmW interface, then alternative approaches would be desired.

To enhance the operation of a wireless communication system that includes one or more repeaters, the repeaters may be equipped with power measurement and reporting capabilities. For example, a L1 mmW repeater may include a power detector that can measure the power of a signal received on the mmW interface (e.g., the power of a wideband analog mmW signal). The repeater may take one or more actions based on the power level measured at the repeater. As one example, the repeater may use the power level information to set one or more communication parameters locally at the repeater (e.g., internal gain level, internal beam management parameters or configurations, etc.). As another example, the repeater may report the power measurement to another device, such as a serving base station. When the repeater is a L1 mmW repeater that does not generate new content for a mmW signal to be sent on the repeater's mmW interface, the L1 mmW repeater may use a side channel, such as the low frequency interface of the L1 mmW repeater, to send the report. The low frequency interface of the repeater may include functionality to interpret content from received messages and generate content for new messages. The device (e.g., base station) that receives the report may then set one or more communication parameters based on the power measurement (e.g., set a gain level of the repeater, set a transmission power level of a transmitting device, set a beamforming configuration, set other beam management parameters, set repeater associations, etc.). The ability to measure power metrics at the repeater may serve to improve the access, association, and/or beam management procedures within a wireless communication system that includes repeaters. Further details will be described below regarding the power measurement, power measurement reporting, and further actions that may be taken based on the power measurements.

FIG. 1 illustrates an example of a wireless communications system 100 that includes a repeater 140 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, a fifth generation (5G) New Radio (NR) network, or another type of network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some systems, millimeter wave (mmW) communications may occur in a frequency range (also known as "FR2") that exists above 24 GHz (which may include portions of the total frequency range that are within the millimeter band as well as near the millimeter band). In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115, another base station 105, or a repeater 140. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115 or repeater 140) a beam direction for subsequent transmission and/or reception by the base station 105. Additionally, a UE 115 or repeater 140 may perform similar beamforming operations (as described herein for the base station 105) for directional communications with other devices (e.g., a base station, a UE, or another repeater).

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115 or repeater 140, which may be examples of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 or a repeater 140 may have one or more antenna arrays that may support various MIMO or beamforming operations.

An individual node (e.g., base station, UE, or repeater) within the wireless communications system 100 may include multiple different communication interfaces each configured for a different type of communication protocol. As one example, a base station 105, a UE 115, or a repeater 140 may include both a wide area network interface (e.g., 4G or 5G cellular) and a local area network interface (e.g., IEEE 802.11 Wi-Fi, or Bluetooth). As another example, a base station 105, a UE 115, or a repeater 140 may include both a high frequency network interface (e.g., mmWave) and a lower frequency network interface that uses a lower frequency band than the mmWave interface (e.g., LTE, sub-6 GHz NR, Wi-Fi, Bluetooth, etc.).

Wireless communications system 100 may include one or more wireless repeaters 140 (also known as a relay). The wireless repeaters 140 may include functionality of base station 105 and/or UE 115 for repeating, forwarding, relaying, extending, and/or redirecting wireless signals. In some cases, a wireless repeater 140 may be used in line of site (LOS) or non-line of sight (NLOS) scenarios. In a LOS scenario, transmissions, such as mmW transmissions, may be limited by path-loss through air, which may be overcome using beamforming techniques at the wireless repeater 140. In a NLOS scenario, such as in an urban area or indoors, mmW transmissions may be limited by signal blocking or signal interfering physical objects.

The repeater 140 may provide an uplink path from a UE to a base station, a downlink path from a base station to a UE, a P2P or D2D path from one UE to another UE, and/or a wireless backhaul path between the base station and a core network device (e.g., via one or more other base stations). In a first example, a mmW beamforming repeater 140 may be utilized to receive a signal from a base station 105 and transmit the signal to the UE 115, such as by receiving the signal on wireless link 150 and then transmitting the signal on wireless link 152. In a second example, a mmW beamforming repeater 140 may be utilized to receive a signal from a UE 115 and transmit the signal to the base station 105, such as by receiving the signal on wireless link 152 and then transmitting the signal on wireless link 150. In a third example, a mmW beamforming repeater 140 may be utilized to receive a signal from one base station 105 and transmit the signal to a different base station 105 (e.g., in a wireless backhaul configuration), such as by receiving the signal on wireless link 150 and then transmitting the signal on wireless link 154. In a fourth example, a mmW beamforming repeater 140 may be utilized to receive a signal from one UE 115 and transmit the signal to a different UE 115 (e.g., in a P2P or D2D protocol configuration), such as by receiving the signal on wireless link 152 and then transmitting the signal on wireless link 156. In each of these examples, the signal transmitted may be a processed version of the received signal (e.g., an amplified version of the received signal with or without further processing such as signal phase shifting, splitting, and/or combining). Beamforming and gain control techniques may be utilized to improve signal quality between the base station 105, repeater 140, and UE 115 by isolating signals (e.g., via beamforming) and improving or maintaining stability within a signal processing chain of the repeater (e.g., via gain control).

The mmW wireless repeater 140 may include an array of reception antennas and an array of transmission antennas. In some cases, the array of reception antennas and the array of transmission antennas comprise the same set of dual-pole antennas, wherein the dual pole antennas function in a first polarization as the array of reception antennas and the dual pole antennas function in a second polarization as the array of transmission antennas. In some cases, the antennas comprise meta-material antennas or antenna arrays. The repeater 140 may further include a beam control system, which may comprise a processor or system on chip (SoC) for controlling transmit and/or receive beams to reduce signal interference caused by retransmission.

In some cases, the mmW wireless repeater 140 is an analog RF repeater, and the mmW wireless repeater 140 may include a signal processing chain connected (e.g., coupled, linked, attached) between the array of reception of antennas and the array of transmission antennas. The signal processing chain may be implemented as a radio frequency integrated circuit (RFIC), which may include RF/microwave components such as one or more phase shifters, (low noise amplifiers) LNAs, (power amplifiers) PAs, PA drivers, gain controllers, power detectors, or other circuitry. The phase shifters may be controlled by one or more beam controllers for beamforming to reduce signal interference. The signal processing chain may include a feedback path for monitoring the output of one or more PAs, and adjusting gains to one or more PA drivers to the PAs and gains to one or more LNAs based on the output. The gain adjustment may function to stabilize the signal reception and transmission and improve signal quality between devices such as base station 105 and UE 115. Accordingly, through beamforming and gain control, signal quality (e.g., mmW signals) may be improved in LOS and NLOS scenarios.

As described, the mmW wireless repeater 140 may include components (e.g., antenna arrays and signal processing chain circuitry) in the analog/RF domain. Accordingly, in some implementations, the mmW wireless repeater may not include any digital components for certain features described herein. For example, the mmW wireless repeater, in some implementations, may not include any digital signal processing functionality that would allow the repeater to decode and interpret the contents of a received mmW signal. As another example, the mmW wireless repeater, in some implementations, may not include any digital signal processing functionality that would allow the repeater to generate new content for a mmWave signal to be sent to another device. In some cases, the mmW wireless repeater may include one or more side channel components that allow the mmW wireless repeater to decode and interpret other types of messages (e.g., non-mmW signals). For example, the mmW wireless repeater may include a side channel communication interface for sending or receiving control messages. The received control messages may include beamforming configurations from a base station 105 or another device. Example side channel communication interfaces may be implemented using one or more of Bluetooth, ultra-wide band, wireless LAN (e.g., IEEE 802.11 Wi-Fi), LTE, or sub-6 GHz NR protocols (or other wireless communication protocols). As such, the repeater may include circuitry and/or processors for transmitting, receiving, and/or processing signals via those protocols and controlling beamforming at the RF/microwave components based on those signals one the side channel communication interface.

Figure 2A:
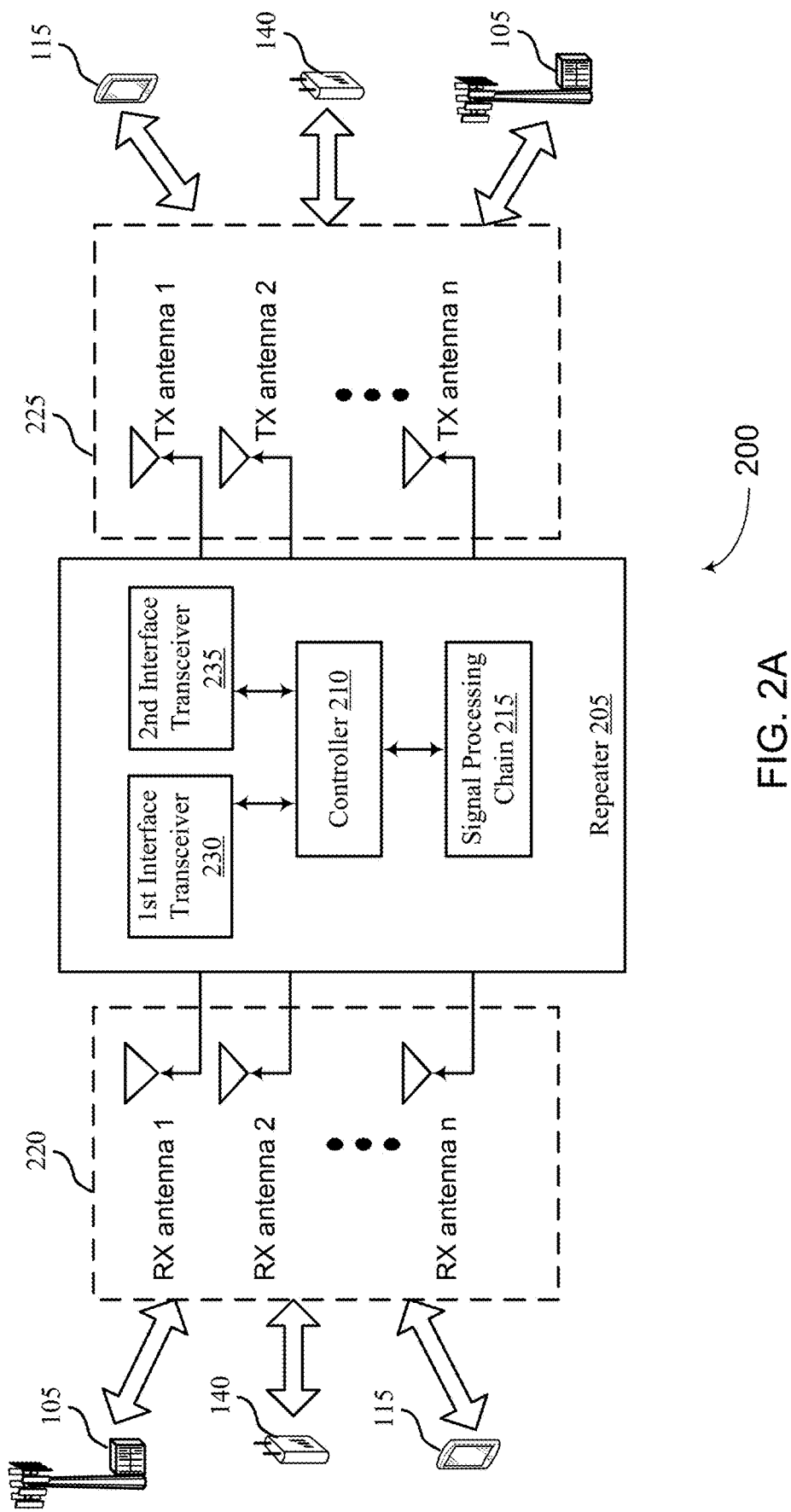
FIG. 2A illustrates an example block diagram of a repeater in accordance with aspects of the present disclosure.

FIG. 2A illustrates an example of a block diagram 200 of a repeater 205 in accordance with aspects of the present disclosure. In some examples, the devices of FIG. 2A may implement aspects of wireless communications system 100, and the repeater 205 may be an example of the repeater 140 of FIG. 1. The repeater 205 includes a reception antenna array 220 including a set of antennas and a transmission antenna array 225 including a set of antennas. In some cases, the reception antenna array 220 and the transmission antenna array 225 are the same antenna arrays including the same set of dual pole antennas functioning in first and second polarizations as the reception and the transmission antenna array. In other cases, the reception antenna array 220 and the transmission antenna array 225 are separate. In some cases, the reception antenna array 220 and/or the transmission antenna array 225 comprise meta-material antennas.

The repeater 205 may further include a controller 210, a signal processing chain 215, a transceiver 230 for a first communication interface (e.g., a non-mmWave interface, such as an interface associated with LTE, sub-6 GHz NR, Wi-Fi, Bluetooth, etc.), and a transceiver 235 for a second communication interface (e.g., a mmWave interface). The non-mmWave interface may use a frequency range that is lower than a frequency range associated with the millimeter wave interface. In some implementations, the signal processing chain 215 includes various circuitry including one or more PAs, LNAs, phase shifters, dividers, and/or combiners. The signal processing chain 215 may include various analog/RF domain components and may be implemented as a RFIC (e.g., MIMIC). In some implementations, the signal processing chain 215 may be implemented by a processor coupled with a memory, where the processor executes instructions stored on the memory to implement the signal processing functions of the repeater described herein. Similarly, the controller 210 may comprise a processor coupled with a memory, where the processor executes instructions stored on the memory to implement the controller functions of the repeater described herein. The processor and memory associated with the controller 210 may be the same or different than the processor or memory associated with the signal processing chain 215.

Controller 210 may comprise a beamformer that controls beam direction and width of the reception antennas 220 and/or the transmission antennas 225 using the phase shifters of the signal processing chain 215 to improve or maintain isolation between various reception and transmission beams. In some cases, the controller 210, using the phase shifters, controls beam direction to ensure target reception and/or transmission beams are sufficiently spread apart to avoid interference. Furthermore, the controller 210 may utilize antenna adjustments to adjust beam width, such as certain amplitude and phase offsets to signals carried via the antenna elements of the reception antenna array 220 and the transmission antenna array 225. In some cases, the adjustments associated with the antenna elements may be defined by a beamforming weight set associated to the antenna arrays 220 and 225.

In some cases, the beam configurations (e.g., width and direction) as well as gain adjustments may be controlled by the base station 105 via a side control channel. The side control channel may operate via the first transceiver 230. For example, the beam controller 210 may be controlled by a base station 105 via a side channel implemented as a Bluetooth channel, ultra-wide band channel, wireless LAN channel, LTE channel, NR sub-6 GHz channel, etc. Accordingly, the repeater 205 may include circuitry for receiving and/or processing side channel communications to control the beam controller 210. The base station 105 may transmit beamforming control configurations based on operating environment, position of a UE, configuration of a UE, and/or other factors (e.g., power measurements made by the repeater).

In some implementations, the repeater 205 uses the first transceiver 230 for sending and/or receiving control messages, and the repeater 205 uses the second transceiver 235 for sending and/or receiving other signals when the repeater 205 is acting as an intermediary between two other devices. For example, the repeater 205 may receive signals from a base station 105 via the second transceiver 235 (associated with a second communication interface of the repeater 205) according to a beamforming configuration and retransmit the signals to a UE 115 via the second transceiver 235 (associated with the second communication interface) according to a beamforming configuration. The repeater 205 may further receive signals from a UE 115 via the second transceiver 235 (associated with the second communication interface) according to a beamforming configuration and retransmit the signals to a base station 105 via the second transceiver 235 (associated with the second communication interface) according to a beamforming configuration. As such, the repeater 205 may function to implement uplink and downlink communications, and the controller 210 and signal processing chain 215 may be utilized for communication in uplink or downlink scenarios. The repeater 205 may also receive signals from one base station 105 via the second transceiver 235 (associated with the second communication interface) according to a beamforming configuration and retransmit the signals to a different base station 105 via the second transceiver 235 (associated with the second communication interface) according to a beamforming configuration (e.g., for wireless backhaul). The repeater 205 may also receive signals from one UE 115 via the second transceiver 235 (associated with the second communication interface) according to a beamforming configuration and retransmit the signals to a different UE 115 via the second transceiver 235 (associated with the second communication interface) according to a beamforming configuration (e.g., D2D or P2P). Additionally, the repeater 205 may also receive signals from another repeater 140 via the second transceiver 235 (associated with the second communication interface) or send signals to another repeater 140 via the second transceiver 235 (associated with the second communication interface) according to a receive and/or transmit beamforming configuration (e.g., in a multi-hop repeater path).

FIG. 2B illustrates an example of a block diagram 245 of a base station 250 in accordance with aspects of the present disclosure. In some examples, the devices of FIG. 2B may implement aspects of wireless communications system 100, and the base station 250 may be an example of the base station 105 of FIG. 1. The base station 250 includes a reception antenna array 255 including a set of antennas and a transmission antenna array 260 including a set of antennas. The antenna arrays 255 and 260 may receive signals from, and transmit signals to, various other devices, including UEs 115, repeaters 140, and/or other base stations 105.

The base station 250 may further include a processor 265, memory 270, a transceiver 275 for a first communication interface (e.g., a non-mmWave interface, such as an interface associated with LTE, sub-6 GHz NR, Wi-Fi, Bluetooth, etc.), and a transceiver 280 for a second communication interface (e.g., a mmWave interface). The processor 265 is coupled with the memory 270, and the processor 265 executes instructions stored on the memory 270 to implement the base station functions described herein. In some implementations, the base station has a full signal processing chain (e.g., a more capable processing chain than the limited processing capabilities of the repeater shown in FIG. 2A) for signals received on via the transceiver 280 associated with the second interface (e.g., the mmWave interface). For example, the base station 250 includes digital signal processing functionality that allows the base station 250 to decode and interpret the contents of a received mmW signal received on the transceiver 280 associated with the second interface. The base station 250 also includes digital signal processing functionality that allows the repeater to generate new content for signals to be sent on the transceiver 280 associated with the second interface (e.g., the mmWave interface).

Figure 3:
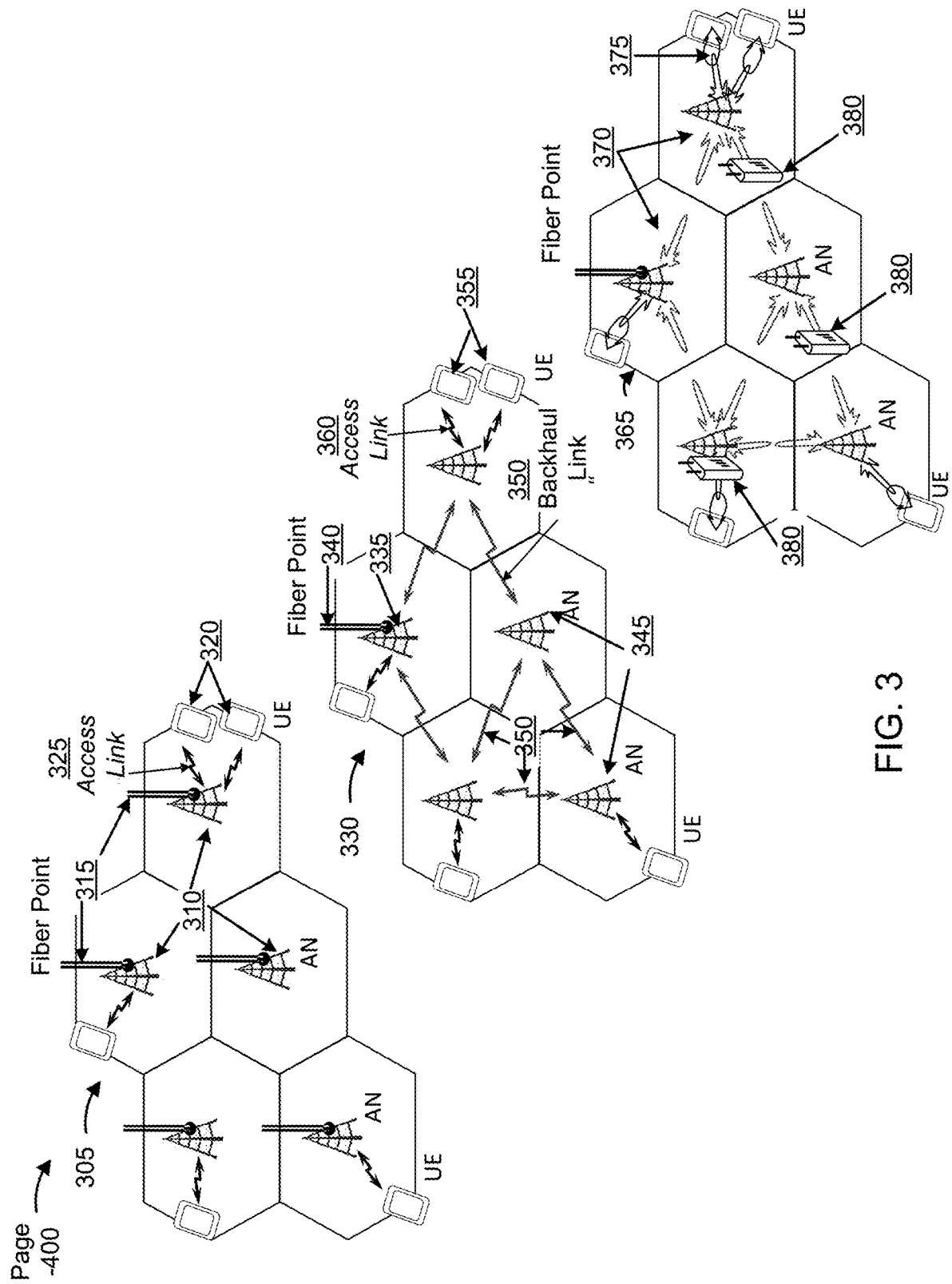
FIG. 3 illustrates examples of radio access networks in accordance with aspects of the present disclosure.

FIG. 3 is a diagram illustrating examples 300 of various types of radio access networks. First, as shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 105 shown in FIG. 1. Similarly, a UE 320 shown in FIG. 3 may correspond to a UE 115 shown in FIG. 1.

Second, as shown by reference number 330, another type of radio access network may utilize a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly with or indirectly with (e.g., via one or more non-anchor base stations 345) the anchor base station 335 via one or more backhaul links 350 to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 105 shown in FIG. 1. Similarly, a UE 355 shown in FIG. 3 may correspond to a UE 115 shown in FIG. 1.

Third, as shown by reference number 365, in some aspects, yet another type of radio access network that includes an IAB network may utilize millimeter wave technology and/or directional communications (e.g., beamforming, precoding, and/or the like) for communications between devices (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced. Additionally, the network 365 may include repeaters 380 that may receive a signal from one device and transmit the signal to a second device. For example, a repeater 380 may be in the signal path between two base stations, between two UEs, between a base station and a UE, between a base station and another repeater, and/or between a UE and another repeater. The repeater 380 may use directional communications (e.g., beamforming, precoding, and/or the like) for communications between devices. The repeater 380 shown in FIG. 3 may correspond to a repeater 140 shown in FIG. 1.

In some aspects, an IAB network may support a multi-hop wireless backhaul. Additionally, or alternatively, nodes of an IAB network may use the same radio access technology (e.g., 5G/NR). Additionally, or alternatively, nodes of an IAB network may share resources for access links and backhaul links, such as time resources, frequency resources, spatial resources, and/or the like. Furthermore, various architectures of IAB nodes and/or IAB donors may be supported.

The configuration of base stations, repeaters, and UEs in FIG. 3 is shown as an example, and other examples are possible. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station). As another example, additional repeaters may be included in different signal transmission paths between two devices.

Figure 4:
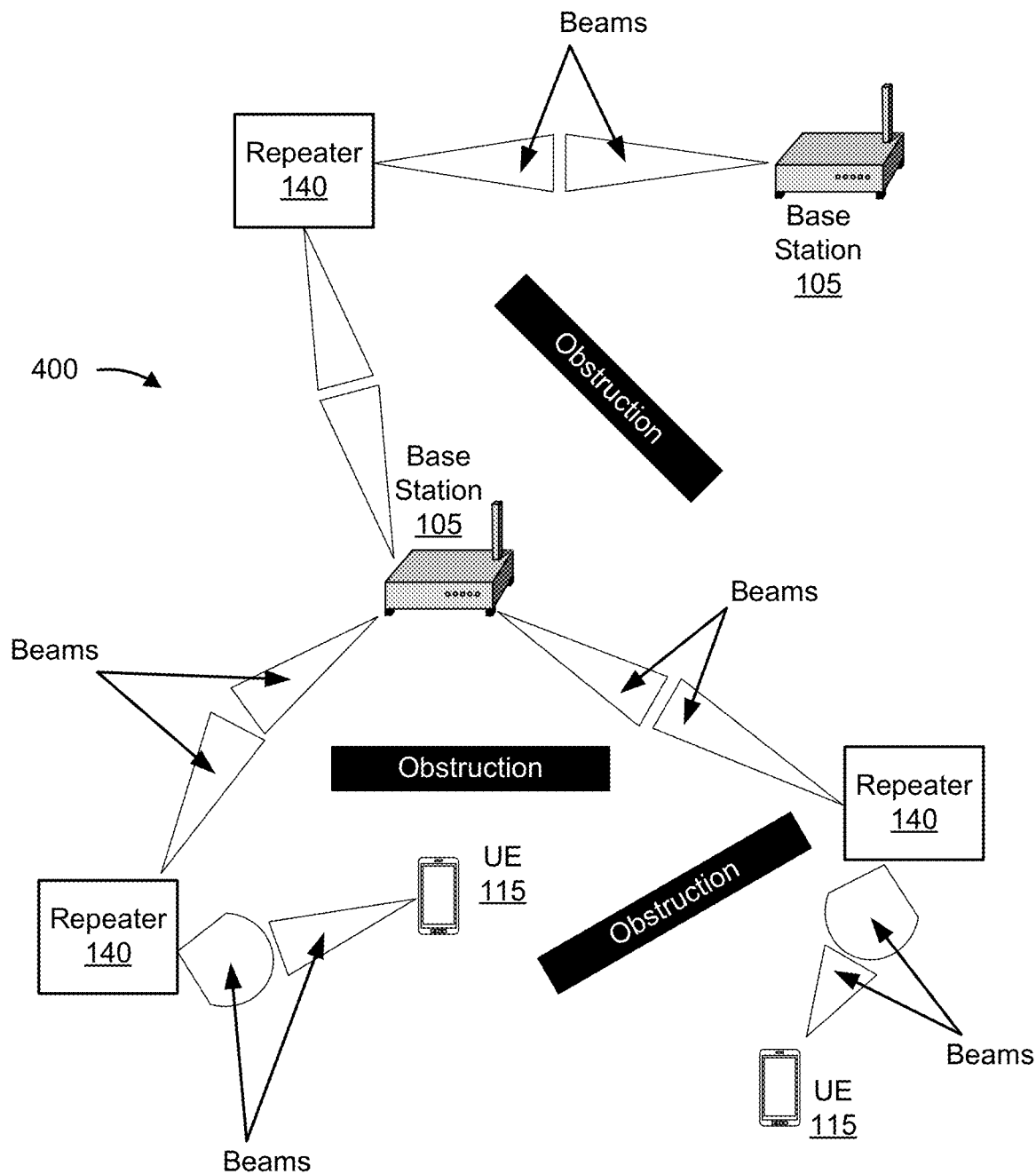
FIG. 4 illustrates an example of communicating using a repeater in accordance with aspects of the present disclosure.

FIG. 4 is a diagram illustrating an example 400 of communicating using an analog millimeter wave repeater, in accordance with various aspects of the present disclosure. Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station 105 that communicates using the sub-6 GHz radio waves. However, a millimeter wave may not be capable of penetrating the same wall (e.g., depending on a thickness of the wall, a material from which the wall is constructed, and/or the like). Some techniques and apparatuses described herein use a millimeter wave repeater 140 to increase the coverage area of a base station 105, to extend coverage to UEs 115 without line of sight to the base station 105 (e.g., due to an obstruction), to extend coverage from one base station 105 to another base station 105 (e.g., due to an obstruction or due to other forms of path loss), and/or the like. Furthermore, the millimeter wave repeater 140 described herein may be a layer 1 or an analog millimeter wave repeater, which is associated with a lower cost, less processing, and lower latency than a layer 2 or layer 3 repeater.

As shown in FIG. 4, a millimeter wave repeater 140 may perform directional communication by using beamforming to communicate with a base station 105 via a first beam (e.g., a backhaul beam over a backhaul link with the base station 105) and to communicate with a UE 115 via a second beam (e.g., an access beam over an access link with the UE 115). Alternatively, the millimeter wave repeater 140 may communicate between two base stations 105 (e.g., in a wireless backhaul link) or between two UEs 115 (e.g., in a D2D or P2P link). To achieve long propagation distances and/or to satisfy a required link budget, the millimeter wave repeater may use narrow beams (e.g., with a beamwidth less than a threshold) for such communications.

However, using a narrower beam requires the use of more resources of the millimeter wave repeater 140 (e.g., processing resources, memory resources, power, battery power, and/or the like) and more network resources (e.g., time resources, frequency resources, spatial resources, and/or the like), as compared to a wider beam, to perform beam training (e.g., to determine a suitable beam), beam maintenance (e.g., to find suitable beam as conditions change due to mobility and/or the like), beam management, and/or the like. This may use resources of the millimeter wave repeater 140 and/or network resources as compared to using a wider beam, and may lead to increased cost of production of millimeter wave repeaters 140, which may be deployed extensively throughout a radio access network.

For example, a millimeter wave repeater 140 may be deployed in a fixed location with limited or no mobility, similar to a base station 105. As shown in FIG. 4, the millimeter wave repeater 140 may use a narrower beam to communicate with the base station 105 without unnecessarily consuming network resources and/or resources of the millimeter wave repeater 140 because the need for beam training, beam maintenance, and/or beam management may be limited, due to limited or no mobility of the base station 105 and the millimeter wave repeater 140 (and/or due to a line of sight communication path between the base station 105 and the millimeter wave repeater 140).

As further shown in FIG. 4, the millimeter wave repeater 140 may use a wider beam (e.g., a pseudo-omnidirectional beam and/or the like) to communicate with one or more UEs 115. This wider beam may provide wider coverage for access links, thereby providing coverage to mobile UEs 115 without requiring frequent beam training, beam maintenance, and/or beam management. In this way, network resources and/or resources of the millimeter wave repeater 140 may be conserved. Furthermore, if the millimeter wave repeater 140 does not include digital signal processing capabilities on the mmWave communication interface, resources of the base station 105 (e.g., processing resources, memory resources, and/or the like) may be conserved that would otherwise be used to perform such signal processing for the millimeter wave repeater 140, and network resources may be conserved that would otherwise be used to communicate input to or output of such processing between the base station 105 and the millimeter wave repeater 140. In this way, the millimeter wave repeater 140 may increase a coverage area, provide access around obstructions (as shown), and/or the like, while conserving resources of the base station 105, resources of the millimeter wave repeater 140, network resources, and/or the like.

Figure 5:
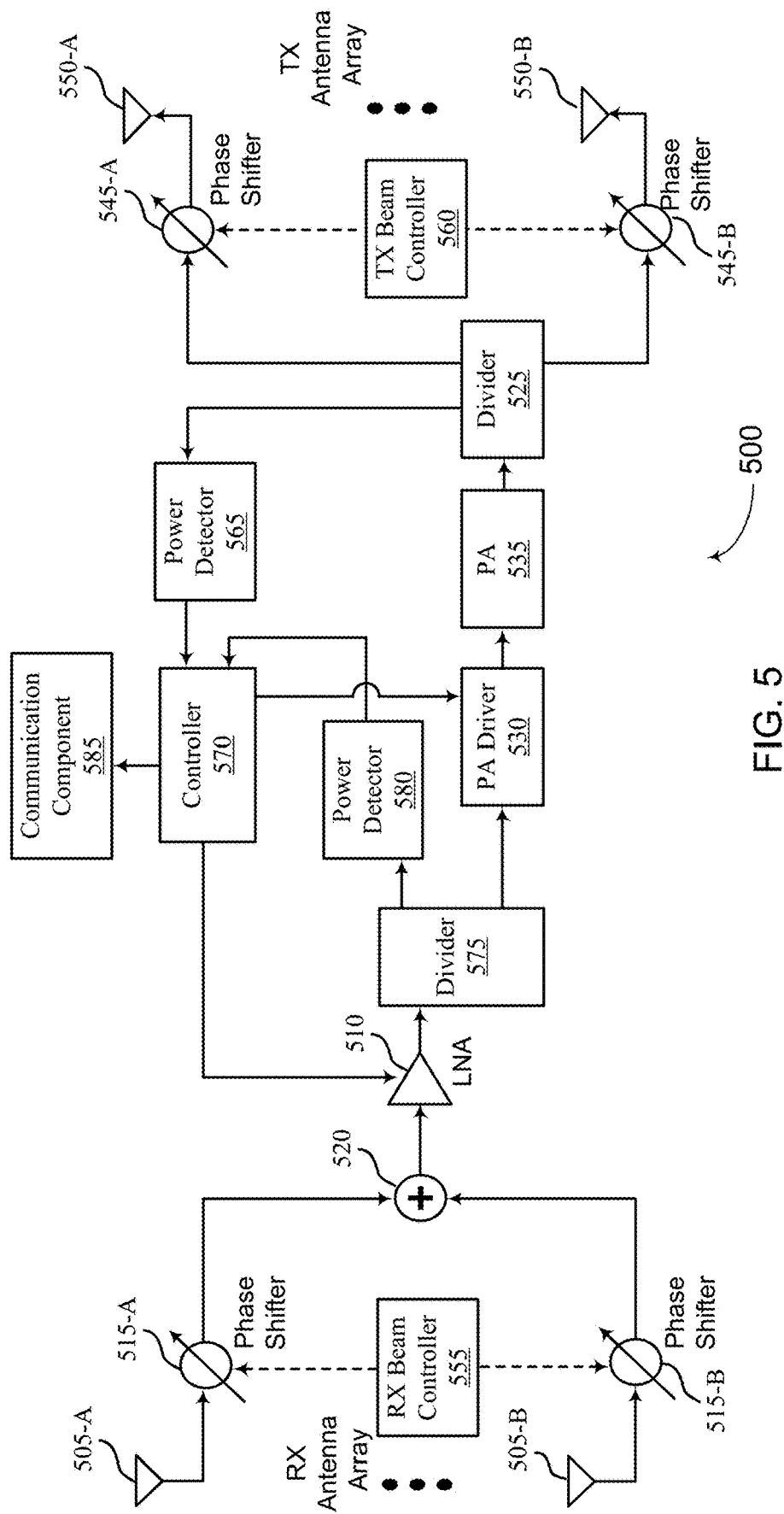
FIG. 5 illustrates an example circuit diagram of a signal processing chain of a repeater in accordance with aspects of the present disclosure.

FIG. 5 illustrates an example of a circuit diagram of a signal processing chain 500 of a repeater (e.g., the repeater 140/205 of FIGS. 1 and 2A, as one example). The signal processing chain 500 in one implementation includes a LNA 510, phase shifters 515 and 545, combiner circuit 520, divider circuit 525, PA driver 530, PA 535, reception beam controller 555, transmission (TX) beam controller 560, controller 570, power detector 565, a divider 575, a power detector 580, and transmission lines connecting various components. These components of the signal processing chain 500 exist between an RX antenna array including antennas 505 and a TX antenna array including antennas 550. Also, the signal processing chain is coupled with a communication component 585, such as via a communication path between the controller 570 and the communication component 585. The signal processing chain 500 may be implemented as a RFIC. Accordingly, the signal processing chain 500 may include connection points between the antennas 505 and 550 and the components of the signal processing chain 500.

A plurality of receive paths for respective RX antennas 505 include phase shifters 515, which may function to pre-process signals received at the RX antenna array comprising the antennas 505, and the pre-processing may result in a plurality of pre-processed instances of the signal routed to the combiner circuit 520. For example, based on RX beam controller 555 signals applied to the phase shifter 515-$a$, the antenna 505-$a$ may receive a signal, which is routed to the phase shifter 515-$a$ of a receive path and to the combiner 520 as a pre-processed instance of the signal. Similarly, based on RX beam controller 555 signals applied to the phase shifter 515-$b$, the antenna 505-$b$ may receive a signal, which is routed to the phase shifter 515-$b$ of a receive path and to the combiner 520 as a pre-processed instance of the signal.

The combiner circuit 520, which may be an example of a Wilkinson power combiner or other RF signal combining circuit, combines the pre-processed instances of the signal received via the plurality of receive paths into a combined signal routed to a signal processing chain including the LNA 510, the PA 535, and the divider circuit 525. The divider circuit 525 divides the combined signal of the signal processing chain to a plurality of transmit paths corresponding to a plurality of antennas 550 of the transmission antenna array. For example, the divider circuit 525 divides the combined signal of the signal processing chain to a transmit path including phase shifter 545-$a$ and antenna 550-$a$. Further, the divider circuit 525 divides the combined signal of the signal processing chain to a transmit path including phase shifter 545-$b$ and antenna 550-$b$. TX beam controller 560 signals the phase shifters 545 to control beam width and/or direction for retransmission of signals at the antennas 550.

In some cases, the signal processing chain includes a feedback path including the power detector 565 coupled to a controller 570 (e.g., for gain control). The power detector 565 receives a signal from the divider circuit 525, and the signal may include the output of the PA 535. Based on the detected output, controller 570 may adjust a gain of PA driver 530 to the PA 535 and/or the LNA 510 to increase or maintain stability of signal transmission within the signal processing chain.

The signal processing chain 500 of the repeater may also measure a power metric of an incoming signal without first passing through the internal PA 535. For example, the repeater may measure a power metric associated with a received signal at power detector 580. The input to power detector 580 may be split off from the main signal path by divider 575. The divider 575 in one implementation may be a hybrid power divider that splits power over two output branches with the proportions: X and 1–X, where X represents a number between 0 and 1. For example, the divider 575 may divert a smaller proportion (e.g., X) of the received signal to the power detector 580 than the proportion (e.g., 1–X) it sends along to the PA driver 530. The divider 575 may divert 1%, 2%, 5%, 10%, 25%, 50%, or any configurable portion of the total power of the signal to the power detector 580 for measurement. In an alternative implementation, the divider 575 and the power detector 580 may instead be placed before the LNA 510 in the signal processing chain.

The output of the power detector 580 is sent to the controller 570. The controller 570 may take one or more actions based on the measured power metric. As one example, the controller 570 may generate and transmit a control message via the communication component 585 to another device (e.g., a base station) that includes the measured power metric. In one example, the communication component 585 includes the lower frequency communication interface of the repeater (e.g., the first interface 230 of FIG. 2A), also referred to as the side channel for control communications. By reporting the measured power metric from the repeater to one or more other devices, the other devices may set one or more communication parameters based on the power metric measured at the repeater. As another example, the controller 570 may set a communication parameter internally within the repeater based on the locally measured power metric. Further details associated with the power measurement capabilities of the repeater will be described below in connection with FIGS. 6-8.

Figure 6:
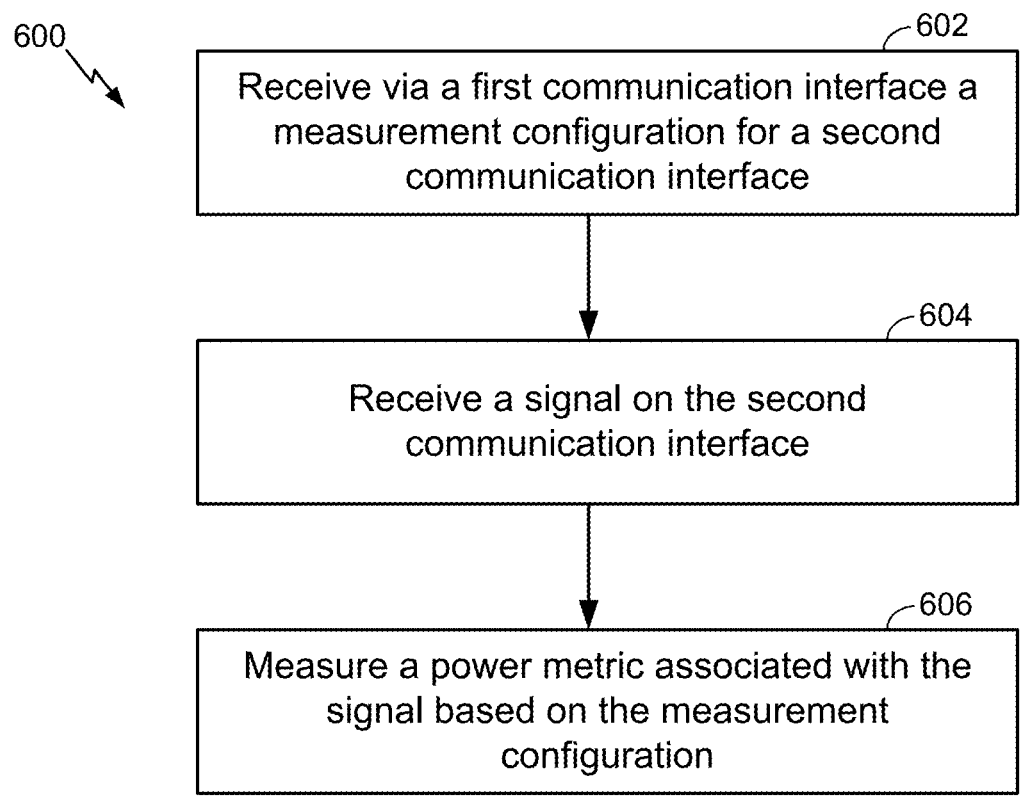
FIG. 6 is a flow diagram illustrating one example of a technique for a repeater to measure a power metric of a received signal in accordance with aspects of the present disclosure.

FIG. 6 is a flow diagram illustrating one example of a process 600 for a repeater to measure a power metric of a received signal in accordance with aspects of the present disclosure. The operations of process 600 may be implemented by a repeater, such as repeater 140, repeater 205, or repeater 380, or its components as described herein with respect to FIGS. 1, 2A, and 3-5. For example, the operations of process 600 may be performed by a signal processing chain as described with reference to FIGS. 2A and 5.

At block 602, the repeater receives a control message via a first communication interface (e.g., via interface 230 of FIG. 2A) of the repeater. The control message indicates a measurement configuration for a second communication interface (e.g., interface 235 of FIG. 2A). The second communication interface is different than the first communication interface. For example, the second communication interface may be a millimeter wave interface and the first communication interface may be a non-millimeter wave interface (e.g., an LTE, sub-6 GHz NR, Wi-Fi, Bluetooth, or other communication protocol interface) that uses a frequency range that is lower than a frequency range associated with the millimeter wave interface.

The repeater may receive the measurement configuration from another device, such as a base station in communication with the repeater. Alternatively, block 602 may be optional to process 600 when the repeater determines the appropriate measurement configuration information itself or otherwise receives information sufficient to trigger a signal measurement.

The measurement configuration provides information regarding a requested measurement to be made by the repeater. For example, the measurement configuration may indicate one or more time periods during which the repeater is requested to measure one or more incoming signals. As another example, the measurement configuration may indicate other communication parameter to use for the measurement, such as which receive beamforming configuration the repeater should use to receive the signal that is to be measured at the repeater.

In some implementations, the measurement configuration may provide instructions for the repeater to measure a single signal with a single receive beamforming configuration. In other implementations, the measurement configuration may provide instructions for the repeater to measure multiple signals using multiple different receive beamforming configurations. For example, the measurement configuration may instruct the repeater to measure a first power metric associated with a first signal at a first time using a first receive beamforming configuration, and it measure a second power metric associated with a second signal at a second time using a second receive beamforming configuration different than the first receive beamforming configuration.

At block 604, the repeater receives a signal from another device via the second communication interface (e.g., interface 235 of FIG. 2A) of the repeater. The received signal may be an analog millimeter wave signal that is received via a first set of antennas. The signal received at block 604 may be a signal that the repeater usually processes (e.g., amplifies) and forwards to another device. For example, the repeater may amplify the analog millimeter wave signal without performing analog-to-digital conversion, and then transmit the amplified version of the received signal to another device via a second set of antennas.

The signal received at block 604 may be a signal sent by the same base station that provided the measurement configuration in block 604. Alternatively, the signal received at block 604 may be a signal sent from a different device, such as a UE or another base station that did not send the measurement configuration in block 604. The other device may send the signal at the request of the base station that provided the measurement configuration in block 604. For example, the base station may send a message to trigger the other device to send the signal at a designated time.

The signal received at block 604 may be a reference signal, a beacon signal, or a special signal that is not one of the 5G NR standardized signals. In some implementations, the received signal is one of the 5G NR over-the-air signals, such as a Synchronization Signal Block (SSB), Channel-State Information Reference Signal (CSI-RS), Tracking Reference Signal (TRS), Phase-Tracking Reference Signal (PTRS), DeModulation Reference Signal (DMRS), Physical Downlink Control Channel (PDCCH), Physical Downlink Shared Channel (PDSCH), Sounding Reference Signal (SRS), Random Access Channel (RACH), Physical Uplink Control Channel (PUCCH), Physical Uplink Shared Channel (PUSCH), etc.

Regarding the one or more signals received at the repeater at block 604, one or multiple other nodes (e.g., base stations or UEs) may send the signals on the corresponding time resources using one or multiple transmit beamforming configurations. In one example, only one node is instructed to send a signal on a specified time resource for measurement purposes. The transmitting node may send one or multiple signals on the specified resource. When there are multiple signals transmitted on the resource, the signals can be frequency division multiplexed (FDM) or space division multiplexed (SDM). The multiple signals may also be transmitted using different transmit beamforming configurations. In another example, multiple nodes are instructed to send a signal on a specified time resource for measurement purposes, and the signals from the multiple nodes may be FDM or SDM. In some implementations, when multiple signals are multiplexed, a follow-up procedure may be initiated to use a finer beam management procedure to identify or isolate a specific signal for measurement.

At block 606, the repeater measures a power metric associated with the received signal based on the measurement configuration (e.g., using power detector 580 of FIG. 5). The power metric may be a received signal strength indicator (RSSI) value, or another metric indicative of the received power of the incoming signal. The repeater may measure the wideband power associated with the received signal. For example, in some implementations, the repeater may not perform filtering or resource block selection to take a narrowband power measurement in accordance with the limited processing capabilities associated with the repeater (e.g., no analog to digital conversion on the mmW interface).

In some implementations, the repeater may only take one power measurement based on the received measurement configuration. Alternatively, the repeater may make multiple measurements based on the received measurement configuration, such as measuring multiple different signals, measuring at multiple different times, measuring with multiple different receive configurations (e.g., beamforming configurations), or measuring signals from multiple different devices.

Figure 7:
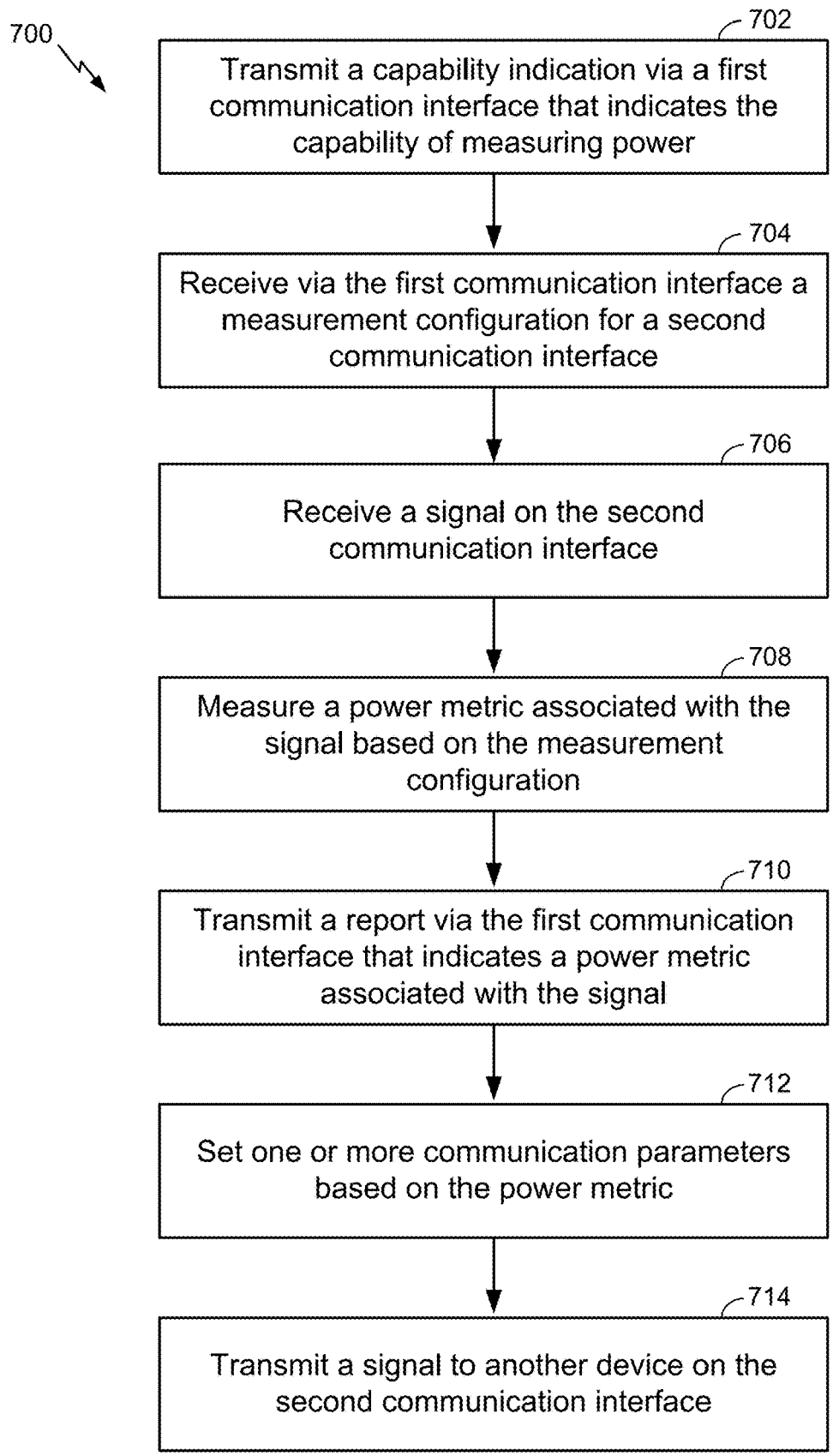
FIG. 7 is a flow diagram illustrating another example of a technique for a repeater to measure a power metric of a received signal in accordance with aspects of the present disclosure.

FIG. 7 is a flow diagram illustrating another example of a process 700 for a repeater to measure a power metric of a received signal in accordance with aspects of the present disclosure. The operations of process 700 may be implemented by a repeater, such as repeater 140, repeater 205, or repeater 380, or its components as described herein with respect to FIGS. 1, 2A, and 3-5. For example, the operations of process 600 may be performed by a signal processing chain as described with reference to FIGS. 2A and 5.

At block 702, the repeater transmits a capability indication to a base station that indicates the repeater is capable of measuring power. The repeater sends the capability indication via the first communication interface (e.g., interface 230 of FIG. 2A).

At block 704, the repeater receives a control message that indicates a measurement configuration, as described above in connection with block 602 (FIG. 6). In implementations where the repeater sends the capability indication, the control message received with the measurement configuration may be sent to the repeater from a base station in response to the repeater transmitting the capability indication. At block 706, the repeater receives a signal from another device, as described above in connection with block 604 (FIG. 6). At block 708, the repeater measures a power metric associated with the received signal, as described above in connection with block 606 (FIG. 6).

At block 710, the repeater transmits a report to a second device (e.g., on interface 230 of FIG. 2A). As one example, the report may be created by controller 570 based on one or more measurements from the power detector 580 and transmitted via the communication component 585 (see FIG. 5). The report indicates a power metric associated with the signal or signals measured in block 708. The report may also include additional information, such as a time associated with the measurement of the power metric, an indication of a beamforming configuration associated with receiving the measured signal, or other information. Additionally, when more than one power metric measurement is reported in a single report, the report may specify details of each individual measurement. For example, where two measurements are made (e.g., with different receive beamforming configurations), the report may indicate a first power metric associated with a first measurement, a first receive beamforming configuration associated with the first measurement, a second power metric associated with a second measurement, and a second receive beamforming configuration associated with the second measurement. The report may similarly include details regarding more than two measurements.

The report may be sent to the device (e.g., base station) that sent the measurement configuration at block 704. Alternatively, the report may be sent to a different device. The repeater may send the report on the first communication interface (e.g., the interface 230 of FIG. 2A).

The report sent at block 710 may be periodic, aperiodic (e.g., dynamically scheduled), or triggered by an event. For a periodic report, the repeater may be configured to send a report to a serving base station (or another device) every X seconds (or milliseconds or minutes), where X is any configurable number. The periodic report could include measurement details, such as a power metric, an indication of the time of measurement, an indication of the receive beamforming configuration used for the measured signal, and/or another other information regarding the signal measurement. The periodic report may include details on one measurement or details for multiple measurements that have occurred since the last periodic report. For an aperiodic report, a serving base station may schedule the repeater to send the report at a designated time, such as by including the reporting schedule in a control message.

For an event-triggered report, the repeater may send a report in response to determining that a specific event occurred. In one implementation, the event trigger may be based on comparing a measured power metric to a threshold and transmitting the report based on a result of the comparison. For example, the repeater may transmit the report when the measured power metric is above the threshold, or when the measured power metric is below the threshold. In another implementation, the event trigger may be based on determining a difference between a currently measured power metric and a previously measured power metric. The repeater may compare the difference to a threshold, and transmit the report based on a result of the comparison. For example, the repeater may transmit the report if the measured power has changed by more than a threshold. In yet another implementation, the event trigger may be based on determining that the power metric will result in a change, or has resulted in a change, to one or more configurations or parameters of the repeater. For example, if the measured power metric would result in the repeater changing an internal communication parameter (e.g., a gain value of its amplifier or beamforming configuration), then the repeater may transmit the report. When an event-trigger approach is used, the report may include an indication of the event that triggered the report transmission.

At block 712, the repeater sets one or more communication parameters within the repeater based on the measured power metric. As one example, the repeater may set, select, or change a gain level of an amplifier within the repeater based on the measured power metric. As another example, the repeater may set, select, or change a beamforming configuration (receive or transmit side) based on the measured power metric. After selecting the beamforming configuration, the repeater may send a beacon signal using the selected beamforming configuration. As yet another example of the repeater setting a communication parameter, the repeater may change from using a first wider receive beamforming configuration to a second narrower receive beamforming configuration based on the measured power metric.

The repeater may also set one or more communication parameters at block 712 based on receiving instructions from another device. For example, in response to the report sent at block 710 (which includes at least one measured power metric), the repeater may receive a message from another device (such as a serving base station that received the report). The message may instruct the repeater to set or change one or more communication parameters of the repeater, and the repeater may make the change accordingly. The message may instruct the repeater to set or change a gain level of an amplifier within the repeater, or may instruct the repeater to set or change a transmit or receive beamforming configuration for the repeater to use.

In another example, the repeater may use the measured power metric locally at block 712 for beam management purposes. The repeater may use the result of an initial power measurement to set a receive beamforming configuration for a later measurement. For example, if the measured power for the initial measurement is greater than a threshold, then the repeater may check other (e.g., finer) receive beams on the resource in the next measurement period. In other implementations, the repeater may autonomously set its beamforming configuration and start forwarding signals to or from that direction. For example, where a repeater has already found a desired beam to communicate with a base station, based on the power measurement, the repeater may identify the existence of a potential UE on a direction and start forwarding signals to that direction.

At block 714, the repeater transmits a signal to another device on the second communication interface (e.g., the interface 235 of FIG. 2A). The signal transmitted at block 714 is generated from the signal received at block 706. The signal transmitted in block 714 may be a modified version of the signal received at block 706. For example, the signal transmitted from the repeater at block 714 may be an amplified version of the signal received at the repeater at block 706. The content of the signal transmitted from the repeater at block 714 may be identical to the content of the signal received at the repeater at block 706. The transmission of the signal at block 714 is to accomplish the forwarding function of the repeater where an incoming analog millimeter wave signal is received from one device and forwarded (with or without amplification) to another device.

Process 700 is a more detailed view of process 600 (FIG. 6). Process 700 includes additional actions at the repeater that may occur before or after the repeater makes the power measurement of the incoming signal or signals. Each of the additional actions may be optional features. For example, blocks 702, 710, and 714 may be optional with respect to the repeater's measurement feature, and block 704 may be optional when the repeater determines the measurement configuration in a different manner (e.g., locally determined). Each of the features if process 700 may all be used together at the repeater, or only a certain subset may be used. As one example, the repeater may transmit its capability indication at block 702 without requiring a report to be sent at block 710. As another example, the repeater may transmit a report at block 710 without requiring a capability indication to be sent at block 702. As yet another example, the repeater may set one or more communication parameters based on a measured power metric at block 712 without requiring a report to be transmitted at block 710. As still yet another example, the repeater may transmit the report at block 710 without requiring any communication parameters to be set based on the measured power metric at block 712.

Figure 8:
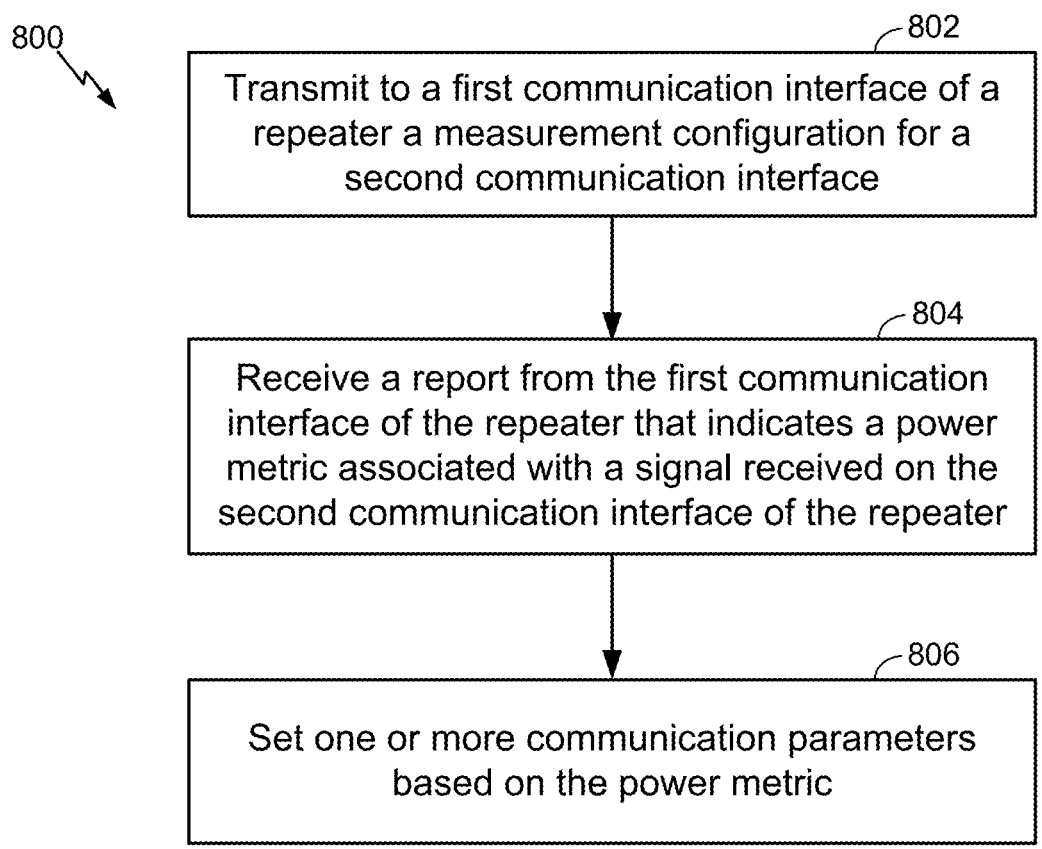
FIG. 8 is a flow diagram illustrating one example of a technique for a base station to set one or more communication parameters based on a power metric measured by a repeater in accordance with aspects of the present disclosure.

FIG. 8 is a flow diagram illustrating one example of a process 800 for a base station to set one or more communication parameters based on a power metric measured by a repeater in accordance with aspects of the present disclosure. The operations of process 800 may be implemented by a base station, such as base station 105 or base station 250, or its components as described herein with respect to FIGS. 1, 2B, and 3-4.

At block 802, the base station transmits a control message to a first communication interface of a repeater (e.g., from interface 275 in FIG. 2B to interface 230 in FIG. 2A). The control message indicates a measurement configuration for a second communication interface of the repeater (e.g., interface 235 in FIG. 2A) that is different than the first communication interface. In some implementations, the base station transmits the control message in response to receiving a capability indication from the repeater that indicates the repeater is capable of measuring power. The measurement configuration transmitted from the base station may include an indication of a receive beamforming configuration for the repeater to use for a measurement, and an indication of one or more time periods for the repeater to measure one or more incoming signals.

At block 804, the base station receives a report from the first communication interface of the repeater (e.g., at interface 275 of FIG. 2B from interface 230 of FIG. 2A) that indicates a power metric associated with a signal received on the second communication interface (e.g., interface 235 of FIG. 2A) and measured at the repeater based on the measurement configuration provided by the base station at block 802. The measurement made at the repeater that is the basis of the report received at block 804 may be a measurement of a signal transmitted from the base station (e.g., from interface 280 of FIG. 2B) that also sent the measurement configuration. Alternatively, the measurement made at the repeater may be a measurement of a signal transmitted by a different device. For example, the base station may instruct another device (a UE or another base station) to transmit the signal to the repeater at a designated time to allow for measurement at the repeater.

The report received at block 804 may include an indication of a measured power metric, an indication of a beamforming configuration used by the repeater to receive the measured signal, or any other information related to the power measurement made at the repeater. The base station may send instructions to the repeater to schedule the repeater to transmit the report at a requested time. Alternatively, the report may be period or event-triggered. Where the report is event-triggered, the report may include an indication of an event that triggered the repeater to send the report. Where multiple measurements are reported in a single report, the report may include measurement details for each measurement. The base station may send the report (or any portion thereof) to another device (such as a UE or another base station) to allow the other device to leverage the measurement information contained therein.

At block 806, the base station sets a communication parameter based on the power metric. In one implementation, the base station sets a communication parameter at block 806 by setting a base station communication parameter to be used locally by the base station for a transmission. As one example, the base station may set or modify, based on the power metric, a transmission power used by the base station for a transmission. As another example, the base station may set or modify, based on the power metric, a beamforming configuration used by the base station for the transmission.

In another implementation, the base station sets a communication parameter at block 806 by instructing the repeater to use a specified communication parameter. For example, the base station may determine a repeater communication parameter based on the power metric included in the report received at the base station. The base station may then transmit a control message to the repeater that instructs the repeater to set a communication parameter based on the repeater communication parameter chosen by the base station. The repeater communication parameter may be a gain level of an amplifier within the repeater, may be a beamforming configuration to be used by the repeater, and/or another communication parameter used by the repeater. The base station may also initiate other adjustments at the repeater based on the received measurement report, such as initiate a finer beam management procedure at the repeater, configure/reconfigure the components of the repeater (e.g., set the beamforming and forwarding configuration at the receiver), or turn off the high frequency interface of the repeater.

In yet another implementation, the base station sets a communication parameter at block 806 by instructing a third device (other than the measuring repeater or the instructing base station) to use a specified communication parameter. For example, the base station may determine a third device communication parameter based on the power metric included in the report received at the base station. The base station may then transmit a control message to the third device that instructs the third device to set a communication parameter based on the third device communication parameter chosen by the base station. The third device communication parameter may be a transmission power or a beamforming configuration to be used by the third device.

In still yet another implementation, the base station sets a communication parameter at block 806 by associating or dis-associating a device with the repeater. As one example, based on the power metric reported from the repeater, the base station may associate one or more user equipment devices with the repeater for an uplink communication through the repeater to the base station. For example, the base station may create or maintain the association when the measured power metric indicates that the repeater would provide a favorable path between a user equipment and the base station. As another example, based on the power metric reported from the repeater, the base station may dis-associate one or more user equipment devices from the repeater. For example, the base station may remove an association when the measured power metric indicates that the repeater would not provide a favorable path between a user equipment and the base station. As yet another example, based on the power metric reported from the repeater, the base station may associate the repeater with the base station for a backhaul link communication from the base station, through the repeater, to a core network device (e.g., potentially through one or more other devices before hitting the core network). For example, the base station may create or maintain the association when the measured power metric indicates that the repeater would provide a favorable path between the base station and the core network.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable sub-combination. As such, although features may be described above as acting in particular combinations, and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on. Furthermore, although certain aspects may be described or claimed in the singular, the plural is contemplated unless limitation to the singular is explicitly stated.

What is claimed is:

1. A method of wireless communication performed by a repeater, comprising:
   receiving, via a first communication interface of the repeater, a control message that indicates a measurement configuration for a second communication interface of the repeater that is different than the first communication interface;
   receiving, via the second communication interface, a first signal at the repeater from a first device;
   measuring, at the repeater, a power metric associated with the first signal based on the measurement configuration;
   transmitting the first signal from the repeater to a second device; and
   setting a communication parameter within the repeater based on the power metric, wherein setting the communication parameter comprises one or more of:
      changing a gain level of an amplifier within the repeater based on the power metric; or
      selecting a beamforming configuration of the repeater based on the power metric.

2. The method of claim 1, wherein receiving the first signal comprises receiving an analog millimeter wave signal via a first set of antennas, wherein the method further comprises amplifying the analog millimeter wave signal at the repeater, and wherein transmitting the first signal comprises transmitting the amplified analog millimeter wave signal from the repeater via a second set of antennas to the second device.

3. The method of claim 1, further comprising transmitting a report from the repeater to another device that indicates the power metric, wherein transmitting the report comprises one or more of:
   comparing the power metric to a threshold at the repeater and transmitting the report from the repeater based on a result of the comparison;
   determining a difference between the power metric and a previous power metric at the repeater, comparing the difference to a threshold at the repeater, and transmitting the report from the repeater based on a result of the comparison; or
   determining that the power metric will result in a change, or has resulted in a change, to one or more configurations of the repeater, and transmitting the report from the repeater in response to the determination that the power metric will result in the change or has resulted in the change.

4. The method of claim 1, further comprising transmitting a report from the repeater to another device that indicates the power metric, wherein the report includes one or more of an indication of an event that triggered the report or an indication of a beamforming configuration associated with receiving the first signal.

5. The method of claim 1, wherein setting the communication parameter comprises:
   changing the gain level of the amplifier within the repeater based on the power metric; and
   selecting a lithe beamforming configuration of the repeater based on the power metric.

6. The method of claim 1, wherein the measurement configuration indicated in the control message comprises an indication of a receive beamforming configuration for the repeater and an indication of one or more time periods for the repeater to measure one or more incoming signals.

7. The method of claim 1, wherein the measurement configuration indicated in the control message comprises an indication of multiple different receive beamforming configurations to use for measurement by the repeater, wherein measuring the power metric comprises measuring a first power metric by the repeater using a first receive beamforming configuration, the method further comprising measuring a second power metric by the repeater using a second receive beamforming configuration different than the first receive beamforming configuration.

8. The method of claim 1, further comprising transmitting a capability indication from the repeater via the first communication interface to a base station that indicates the repeater is capable of measuring power, and wherein receiving the control message comprises receiving the control message at the repeater from the base station in response to transmitting the capability indication.

9. The method of claim 1, further comprising:
   transmitting a report from the repeater to a base station that indicates the power metric; and
   receiving a message at the repeater from the base station in response to the report that sets the beamforming configuration for the repeater to use or sets the gain level of the amplifier within the repeater.

10. A method of wireless communication performed by a base station, comprising:
    transmitting a control message to a first communication interface of a repeater that indicates a measurement configuration for a second communication interface of the repeater that is different than the first communication interface;
    receiving a report from the first communication interface of the repeater that indicates a power metric associated with a signal received on the second communication interface and measured at the repeater based on the measurement configuration; and
    setting a communication parameter based on the power metric, wherein setting the communication parameter comprises one or more of:
       setting, based on the power metric, a transmission power or a beamforming configuration used by the base station;
       instructing, based on the power metric, the repeater to set a gain level of an amplifier within the repeater or a beamforming configuration to be used by the repeater; or
       instructing, based on the power metric, a third device to set a transmission power or a beamforming configuration to be used by the third device.

11. The method of claim 10, wherein the measurement configuration indicated in the control message comprises an indication of a receive beamforming configuration and an indication of one or more time periods for the repeater to measure one or more signals.

12. The method of claim 10, wherein the control message is a first control message, wherein setting the communication parameter comprises:
    determining a repeater communication parameter based on the power metric, wherein the repeater communication parameter comprises one or more of the gain level of the amplifier within the repeater or the beamforming configuration to be used by the repeater; and
    transmitting a second control message to the repeater that instructs the repeater to set a communication parameter based on the repeater communication parameter determined by the base station.

13. The method of claim 10, wherein setting the communication parameter comprises setting, based on the power metric, a base station communication parameter to be used by the base station for a transmission, wherein the base station communication parameter comprises one or more of the transmission power used by the base station for the transmission or the beamforming configuration used by the base station for the transmission.

14. The method of claim 10, wherein setting the communication parameter comprises:
determining, based on the power metric, a communication parameter associated with the third device different than the base station and the repeater; and
transmitting a control message to the third device that instructs the third device to set a parameter based on the communication parameter determined by the base station.

15. The method of claim 10, wherein setting the communication parameter comprises one or more of:
associating, based on the power metric, one or more other devices with the repeater for a communication with the base station through the repeater; or
dis-associating, based on the power metric, one or more other devices from using the repeater.

16. An apparatus for wireless communication, comprising:
a processor; and
a memory coupled with the processor, wherein the memory includes instructions executable by the processor to cause the apparatus to:
receive, via a first communication interface of a repeater, a control message that indicates a measurement configuration for a second communication interface of the repeater that is different than the first communication interface;
receive, via the second communication interface, a first signal at the repeater from a first device;
measure, at the repeater, a power metric associated with the first signal based on the measurement configuration;
transmit the first signal from the repeater to a second device; and
set a communication parameter within the repeater based on the power metric, wherein the instructions executable by the processor to cause the apparatus to set the communication parameter comprise instructions executable by the processor to cause the apparatus to one or more of:
change a gain level of an amplifier within the repeater based on the power metric; or
select a beamforming configuration of the repeater based on the power metric.

17. The apparatus of claim 16, wherein the instructions executable by the processor to cause the apparatus to receive the first signal comprise instructions executable by the processor to cause the apparatus to receive an analog millimeter wave signal via a first set of antennas, wherein the memory includes further instructions executable by the processor to cause the apparatus to amplify the analog millimeter wave signal at the repeater, and wherein the instructions executable by the processor to cause the apparatus to transmit the first signal comprise instructions executable by the processor to cause the apparatus to transmit the amplified analog millimeter wave signal from the repeater via a second set of antennas to the second device.

18. The apparatus of claim 16, wherein the memory includes further instructions executable by the processor to cause the apparatus to transmit a report from the repeater to another device that indicates the power metric, wherein the instructions executable by the processor to cause the apparatus to transmit the report comprise one or more of:
instructions executable by the processor to cause the apparatus to compare the power metric to a threshold at the repeater and transmit the report from the repeater based on a result of the comparison;
instructions executable by the processor to cause the apparatus to determine a difference between the power metric and a previous power metric at the repeater, compare the difference to a threshold at the repeater, and transmit the report from the repeater based on a result of the comparison; or
instructions executable by the processor to cause the apparatus to determine that the power metric will result in a change, or has resulted in a change, to one or more configurations of the repeater, and transmit the report from the repeater in response to the determination that the power metric will result in the change or has resulted in the change.

19. The apparatus of claim 16, wherein the memory includes further instructions executable by the processor to cause the apparatus to transmit a report from the repeater to another device that indicates the power metric, wherein the report includes one or more of an indication of an event that triggered the report or an indication of a beamforming configuration associated with receipt of the first signal.

20. The apparatus of claim 16, wherein the instructions executable by the processor to cause the apparatus to set the communication parameter comprise:
instructions executable by the processor to cause the apparatus to change the gain level of the amplifier within the repeater based on the power metric; and
instructions executable by the processor to cause the apparatus to select the beamforming configuration of the repeater based on the power metric.

21. The apparatus of claim 16, wherein the measurement configuration indicated in the control message comprises an indication of a receive beamforming configuration for the repeater and an indication of one or more time periods for the repeater to measure one or more incoming signals.

22. The apparatus of claim 16, wherein the measurement configuration indicated in the control message comprises an indication of multiple different receive beamforming configurations to use for measurement by the repeater, wherein the instructions executable by the processor to cause the apparatus to measure the power metric comprises instructions executable by the processor to cause the apparatus to:
measure a first power metric by the repeater using a first receive beamforming configuration; and
measure a second power metric by the repeater using a second receive beamforming configuration different than the first receive beamforming configuration.

23. The apparatus of claim 16, wherein the memory includes further instructions executable by the processor to cause the apparatus to transmit a capability indication from the repeater via the first communication interface to a base station that indicates the repeater is capable of measuring power, and wherein the instructions executable by the processor to cause the apparatus to receive the control message comprise instructions executable by the processor to cause the apparatus to receive the control message at the repeater from the base station in response to transmission of the capability indication.

24. The apparatus of claim 16, wherein the memory includes further instructions executable by the processor to cause the apparatus to:
transmit a report from the repeater to a base station that indicates the power metric; and receive a message at the repeater from the base station in response to the report that sets the beamforming configuration for the repeater to use or sets the gain level of the amplifier within the repeater.

25. An apparatus for wireless communication, comprising:
a processor; and
a memory coupled with the processor, wherein the memory includes instructions executable by the processor to cause the apparatus to:
transmit a control message from a base station to a first communication interface of a repeater that indicates a measurement configuration for a second communication interface of the repeater that is different than the first communication interface;
receive a report at the base station from the first communication interface of the repeater that indicates a power metric associated with a signal received on the second communication interface and measured at the repeater based on the measurement configuration; and
set a communication parameter by the base station based on the power metric, wherein the instructions executable by the processor to cause the apparatus to set the communication parameter comprise instructions executable by the processor to cause the apparatus to one or more of:
set, based on the power metric, a transmission power or a beamforming configuration used by the base station;
instruct, based on the power metric, the repeater to set a gain level of an amplifier within the repeater or a beamforming configuration to be used by the repeater; or
instruct, based on the power metric, a third device to set a transmission power or a beamforming configuration to be used by the third device.

26. The apparatus of claim 25, wherein the measurement configuration indicated in the control message comprises an indication of a receive beamforming configuration and an indication of one or more time periods for the repeater to measure one or more signals.

27. The apparatus of claim 25, wherein the control message is a first control message, wherein the instructions executable by the processor to cause the apparatus to set the communication parameter comprise instructions executable by the processor to cause the apparatus to:
determine a repeater communication parameter based on the power metric, wherein the repeater communication parameter comprises one or more of the gain level of the amplifier within the repeater or the beamforming configuration to be used by the repeater; and
transmit a second control message to the repeater that instructs the repeater to set a communication parameter based on the repeater communication parameter determined by the base station.

28. The apparatus of claim 25, wherein the instructions executable by the processor to cause the apparatus to set the communication parameter comprise instructions executable by the processor to cause the apparatus to set, based on the power metric, a base station communication parameter to be used by the base station for a transmission, wherein the base station communication parameter comprises one or more of the transmission power used by the base station for the transmission or the beamforming configuration used by the base station for the transmission.

29. The apparatus of claim 25, wherein the instructions executable by the processor to cause the apparatus to set the communication parameter comprise instructions executable by the processor to cause the apparatus to:
determine, based on the power metric, a communication parameter associated with the third device different than the base station and the repeater; and
transmit a control message to the third device that instructs the third device to set a parameter based on the communication parameter determined by the base station.

30. The apparatus of claim 25, wherein the instructions executable by the processor to cause the apparatus to set the communication parameter comprise one or more of:
instructions executable by the processor to cause the apparatus to associate, based on the power metric, one or more other devices with the repeater for a communication with the base station through the repeater; or
instructions executable by the processor to cause the apparatus to dis-associate, based on the power metric, one or more other devices from using the repeater.

* * * * *